Dec. 20, 1966  Y. ROSENTHAL ET AL  3,292,378
SUBSURFACE IRRIGATION CONDUIT
Filed April 10, 1964

YUVAL ROSENTHAL
ROBLEY C. BROWN
INVENTORS

BY *Hazard & Miller*

ATTORNEYS

United States Patent Office 3,292,378
Patented Dec. 20, 1966

3,292,378
SUBSURFACE IRRIGATION CONDUIT
Yuval Rosenthal, West Covina, and Robley C. Brown, Pomona, Calif., assignors to Moisture Miser Systems-Pomona, Pomona, Calif., a corporation of California
Filed Apr. 10, 1964, Ser. No. 358,773
2 Claims. (Cl. 61—13)

This invention relates to subsurface irrigation conduits.

Subsurface irrigation can be accomplished by the use of underground conduits having water outlet apertures at spaced points therealong, so that water will flow from the outlet into the ground, where it will spread through the ground and supply moisture to the roots of grasses and other plants without the evaporation incident to irrigation by sprays or the like above the surface of the ground; thereby conserving irrigation water.

The conduit can be laid in any desired configuration, the distance between different portions of the underground conduit being determined by the space between the outlet apertures and the size or flow capacity of the apertures.

It is an object of the present invention to provide a subsoil irrigation conduit which can be manufactured in large quantities at a relatively low cost, the conduit preferably being made of a flexible plastic material which is resistant to the corrosive action of the ground.

Another object of the invention is to provide a conduit having spaced apertures and outlet orifices or nozzles in the apertures in combination with a protective member or flap which overlies the orifices, wherein the orifice is so constructed that the protective flap will not prevent the flow or seepage of water through the orifice.

A further object of the invention is to provide a conduit with spaced outlets and a protective flap extending substantially the length of the conduit, wherein the flap is provided with a free edge so shaped that water can be carried along the outside of the conduit between said conduit and the flap and distributed, not only at the location of the orifices, but at points between adjacent orifices.

Still a further object is to provide a conduit and protective flap structure wherein the flap is integral with the conduit, and wherein the conduit and flap can be formed simultaneously by extrusion to any desired length.

The above and other objects will more fully appear from the following description in connection with the accompanying drawing, in which.

Figure 1:
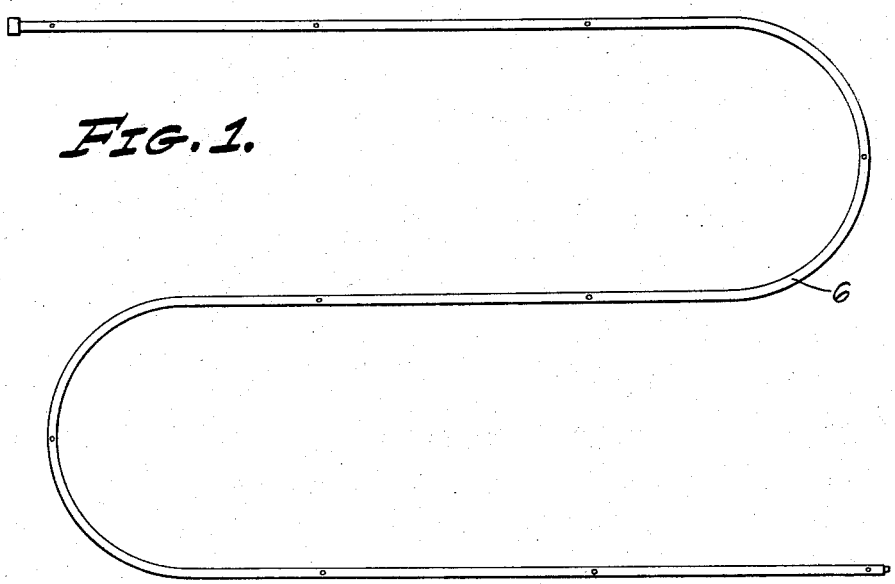
FIG. 1 is a schematic view of a length of conduit indicating a preferred manner of laying the same to provide uniform distribution of water, the outlet orifices being shown but the protective flap being omitted.

In the drawing there is shown a flexible conduit 6 formed of a flexible plastic material which is resistant to the corrosive action of chemicals in the ground. The conduit is preferably formed by extrusion, and at the time it is formed, a flexible protective flap 8 is extruded integrally therewith. The flap 8 has a free longitudinal edge 10 which normally lies against the outer wall of the conduit 6. This free edge is preferably irregularly formed so that water flowing along the outside of the conduit 6 beneath the flap 8, can readily seep out between the flap edge 10 and the conduit, even though the flap is subjected to the weight of the ground in which it is buried. The conduit and flap are buried by forming a small trench in the desired configuration of the layout of the conduit, and then covered with earth.

Figure 3:
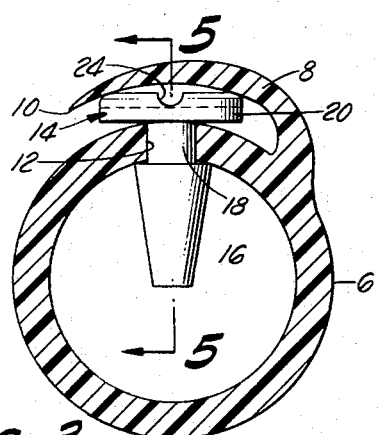
FIG. 3 is an enlarged fragmentary sectional view taken approximately on the line 3—3 of FIG. 2.
Figure 5:
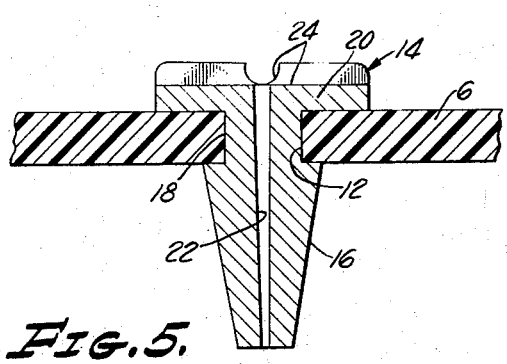
FIG. 5 is an enlarged fragmentary sectional view taken approximately on the line 5—5 of FIG. 5.

At spaced points along the conduit 6 are apertures 12, which are adapted to receive outlet orifices or nozzles, indicated generally at 14. As shown in FIGS. 3 and 5, each orifice or nozzle has a reduced taper 16 from a medial portion thereof inwardly or downwardly, the medial portion is provided with a reduction 18, and the outer head 20 is enlarged. The reduction 18 receives that portion of the tubular conduit 6 which defines the aperture 12.

A longitudinal bore 22 extends axially of the orifice or nozzle and its outer end is in communication with crossed curves 24 formed inwardly from the top of the member.

As shown in FIG. 3, when one of the orifices or nozzle is inserted in the conduit 6, the flap 8 will overlie it and prevent it from being clogged with earth. By reason of the crossed curves 24, water will flow freely and not be obstructed by the flap 8, since said flap might at times be pressed down upon the outer end of the orifice member due to pressure of the earth.

Figure 4:
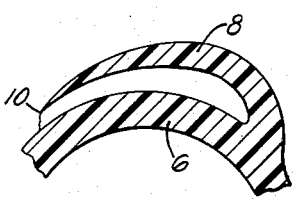
FIG. 4 is an enlarged sectional view taken approximately on the line 4—4 of FIG. 2.
Figure 2:
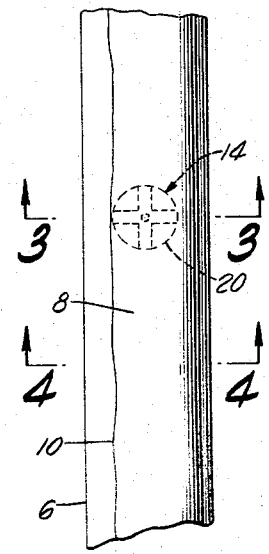
FIG. 2 is an enlarged fragmentary view of a section of conduit showing an outlet orifice or nozzle in full and broken lines.

FIG. 4 shows a section through the conduit 6 and flap 8 between the spaced outlets, showing how the free edge 10 of the flap has irregular or interrupted contact with the outer wall of the conduit. By reason of this flap edge construction, some of the water will flow between the conduit and the flap and from beneath the free edge of the flap generally along the conduit between the outlets 14. It will be seen in FIG. 4 that the curvature of the underside of the flap 8 is on a shorter radius than that of the cross-sectional curve of the outer wall of the conduit so that water can readily flow longitudinally of the conduit beneath the flap.

From the foregoing it will be seen that I have provided a subsurface irrigation conduit which can be made economically in the form of an extrusion with the inserted orifices or nozzles at spaced points. The conduit is laid in any desired manner, such as in FIG. 1. The flow capacity of each outlet is such that it will adequately moisten the ground a distance equal to about half the distance between outlets, and the several runs of the conduit, as laid out in FIG. 1, are spaced apart approximately half the distance between adjacent conduits to provide uniformity of distribution of the water.

By reason of the protective flap 8, it is of no great consequence whether the outlets are disposed upwardly or not, since the flap 8 will protect the outlets against clogging by the earth fill over them.

It will of course be understood that various changes can be made in the form, detail, arrangement and proportions of the various parts, without departing from the spirit of the invention.

I claim:

1. A subsurface irrigation conduit comprising an elongated flexible tubular member having spaced outlet nozzles inserted through the wall thereof, said conduit having an integral flap continuously connected at one edge along the length of the conduit, said flap having a free irregular terminal opposite edge portion overlying and yieldably contacting said nozzles and the conduit portions between the nozzles, said flap defining an arched passageway longitudinally of the conduit, and each nozzle having a port with an inlet in said conduit and an outlet into said arched passageway under said flap.

2. The structure in claim 1, and said nozzle port being disposed axially of the nozzle and terminating in a transverse outlet channel.

References Cited by the Examiner

UNITED STATES PATENTS

| | | | |
|---|---|---|---|
| 953,080 | 3/1910 | Wiggins | 61—13 |
| 1,058,582 | 4/1913 | Harris | 61—12 |
| 2,536,196 | 1/1951 | MacLeod | 61—13 |
| 2,563,300 | 8/1951 | Aker | 239—269 X |
| 3,080,124 | 3/1963 | Rathmann | 239—450 |

FOREIGN PATENTS 922,745   1/1955   Germany.

EARL J. WITMER, *Primary Examiner.*